(12) United States Patent
Nam et al.

(10) Patent No.: US 8,970,812 B2
(45) Date of Patent: Mar. 3, 2015

(54) CIRCULAR POLARISING PLATE AND A REFLECTIVE LIQUID-CRYSTAL DISPLAY DEVICE COMPRISING THE SAME

(75) Inventors: Sung-Hyun Nam, Daejeon (KR); Hyuk Yoon, Gyeonggi-do (KR); Kyun Il Rah, Daejeon (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 223 days.

(21) Appl. No.: 13/634,819

(22) PCT Filed: Mar. 15, 2011

(86) PCT No.: PCT/KR2011/001807
§ 371 (c)(1),
(2), (4) Date: Sep. 13, 2012

(87) PCT Pub. No.: WO2011/115411
PCT Pub. Date: Sep. 22, 2011

(65) Prior Publication Data
US 2013/0010236 A1    Jan. 10, 2013

(30) Foreign Application Priority Data
Mar. 17, 2010 (KR) .................... 10-2010-0023751

(51) Int. Cl.
  G02F 1/1335   (2006.01)
  G02B 5/30     (2006.01)
  G02F 1/13363  (2006.01)
(52) U.S. Cl.
  CPC .. G02B 5/3033 (2013.01); G02F 2001/133531 (2013.01); G02F 2001/133638 (2013.01); G02F 1/133528 (2013.01); G02F 2413/08 (2013.01); G02F 2001/133541 (2013.01)

USPC ................... 349/98; 349/102; 359/486.03
(58) Field of Classification Search
USPC .............. 349/98, 102; 359/484.05, 486.03
See application file for complete search history.

(56) References Cited

U.S. PATENT DOCUMENTS

| | | | |
|---|---|---|---|
| 5,107,356 A * | 4/1992 | Castleberry | .................. 349/119 |
| 5,926,310 A | 7/1999 | Tamura et al. | |
| 6,480,251 B1 | 11/2002 | Yamaguchi et al. | |
| 2003/0025860 A1 | 2/2003 | Suzuki | |
| 2003/0234898 A1 | 12/2003 | Kawanishi | |
| 2007/0035681 A1 | 2/2007 | Okada et al. | |
| 2007/0207277 A1 | 9/2007 | Mizushima et al. | |
| 2008/0036946 A1 | 2/2008 | Ono et al. | |

(Continued)

FOREIGN PATENT DOCUMENTS

| | | |
|---|---|---|
| CN | 1303488 A | 7/2001 |
| CN | 1860389 A | 11/2006 |

(Continued)

Primary Examiner — James Dudek
(74) Attorney, Agent, or Firm — McKenna Long & Aldridge, LLP

(57) ABSTRACT

Provided are a circular polarizer and a reflective liquid crystal display including the same. The circular polarizer includes a polarizer comprising a polarizing film in which an absorption axis has an angle of about 85° to about 95° with respect to a liquid crystal alignment direction of a liquid crystal cell, where, in CIE coordinates, a color "a" is about −1 to about −0.6 and a color "b" is about 0.3 to about 2.5 and a ¼ wavelength plate in which an optical axis has an angle of about 130° to about 140° with respect to the liquid crystal alignment direction of the light crystal cell. When the circular polarizer is used, the visibility and color tone of the reflective liquid crystal display may be improved.

11 Claims, 2 Drawing Sheets

(56) References Cited

U.S. PATENT DOCUMENTS

| | | |
|---|---|---|
| 2009/0109379 A1 | 4/2009 | Fukagawa et al. |
| 2009/0257003 A1 | 10/2009 | Yoshihara et al. |
| 2009/0262287 A1 | 10/2009 | Nishida |

FOREIGN PATENT DOCUMENTS

| | | |
|---|---|---|
| CN | 101460306 A | 6/2009 |
| JP | 2002-006306 | 1/2002 |
| JP | 2003-050396 | 2/2003 |
| JP | 2003-207625 | 7/2003 |
| JP | 2007-264480 | 10/2007 |
| JP | 2009-048213 | 3/2009 |
| TW | 200521502 | 7/2005 |
| TW | 200628859 | 8/2006 |
| WO | 02/35263 | 5/2002 |
| WO | 2005/029143 A1 | 3/2005 |

* cited by examiner

↔ OPTICAL AXIS OF 1/4 WAVELENGTH PLATE

↔ ABSORPTION AXIS OF POLARLIZER

CIRCULAR POLARISING PLATE AND A REFLECTIVE LIQUID-CRYSTAL DISPLAY DEVICE COMPRISING THE SAME

This application is a National Stage Entry of International Application No. PCT/KR2011/001807, filed Mar. 15, 2011, and claims the benefit of Korean Application No. 10-2010-0023751, filed on Mar. 17, 2010, which are hereby incorporated by reference in its entirety for all purposes as if fully set forth herein.

BACKGROUND OF THE INVENTION

1. Field of the Invention

The present invention relates to a circular polarizer used in a reflective liquid crystal display, and more particularly, to a circular polarizer having superior visibility and white balance and a reflective liquid crystal display including the same.

2. Description of the Prior art

In general, liquid crystal displays (LCDs) may be classified into a transmissive LCD that uses a backlight as a light source and a reflective LCD that uses external natural light or artificial light as a light source without using a backlight.

In the case of the transmissive LCD, a bright image may be realized even in a dark external environment by using a backlight as a light source. However, it may be difficult to recognize an image in a bright place, and also a large amount of power may be consumed. On the contrary, since the reflective LCD uses external natural or artificial light as a light source, power consumption may be reduced. In addition, since the reflective LCD does not use a backlight, the reflective LCD may be thin and light. Thus, the current trend is an increase in the adoption of the reflective LCD in portable terminals such as mobile phones.

A reflective LCD according to a prior art includes upper and lower substrates formed of a transparent material, a liquid crystal cell disposed between the upper substrate and the lower substrate, a reflective plate disposed under the lower substrate or between the lower substrate and the liquid crystal cell, a ¼ phase difference plate disposed on the upper substrate, and a polarizer disposed on the ¼ phase difference plate.

However, in the reflective LCD according to the prior art, a color difference may occur due to the occurrence of a path difference of reflected light in contradistinction to transmitted light. Thus, a yellowish phenomenon in which a screen has a yellowish tinge may occur to deteriorate a color tone. In addition, light transmittance may be reduced to thereby reduce brightness when compared to the transmissive LCD.

SUMMARY OF THE INVENTION

An aspect of the present invention provides a circular polarizer, which allows for the realization of improved transmittance and color tone and a reflective liquid crystal display including the same.

According to an aspect of the present invention, there is provided a circular polarizer for a reflective liquid crystal display including: a polarizer including a polarizing film in which an absorption axis has an angle of about 85° to about 95° with respect to a liquid crystal alignment direction of a liquid crystal cell; and a ¼ wavelength plate in which an optical axis has an angle of about 130° to about 140° with respect to the liquid crystal alignment direction of the light crystal cell.

Here, the polarizing film may be formed of a poly vinyl alcohol film. The polarizing film may have a transmittance of about 43% to 47%. In CIE coordinates, a color "a" may be about −1 to about −0.6 and a color "b" may be about 0.3 to about 2.5.

The ¼ wavelength plate may include a monoaxial oriented film having an in-plane phase difference of about 120 nm to 170 nm in a wavelength of about 550 nm.

According to another aspect of the present invention, there is provided a reflective liquid crystal display including: an upper substrate; a lower substrate facing the upper substrate at a predetermined distance; a liquid crystal cell disposed between the upper substrate and the lower substrate; a reflective plate disposed between the lower substrate and the liquid crystal cell or under the lower substrate; and a circular polarizer disposed on the upper substrate, wherein the circular polarizer includes: a polarizer including a polarizing film in which an absorption axis has an angle of about 85° to about 95° with respect to a liquid crystal alignment direction of a liquid crystal cell; and a ¼ wavelength plate in which an optical axis has an angle of about 130° to about 140° with respect to the liquid crystal alignment direction of the light crystal cell.

Here, the polarizing film may be formed of a poly vinyl alcohol film. The polarizing film may have a transmittance of about 43% to 47%. In CIE coordinates, a color "a" may be about −1 to about −0.6 and a color "b" may be about 0.3 to about 2.5.

The ¼ wavelength plate may include a monoaxial oriented film having an in-plane phase difference of about 120 nm to 170 nm in a wavelength of about 550 nm.

The reflective liquid crystal display may be operated in an in plane switching (IPS) mode or an electrically controlled birefringence (ECB) mode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
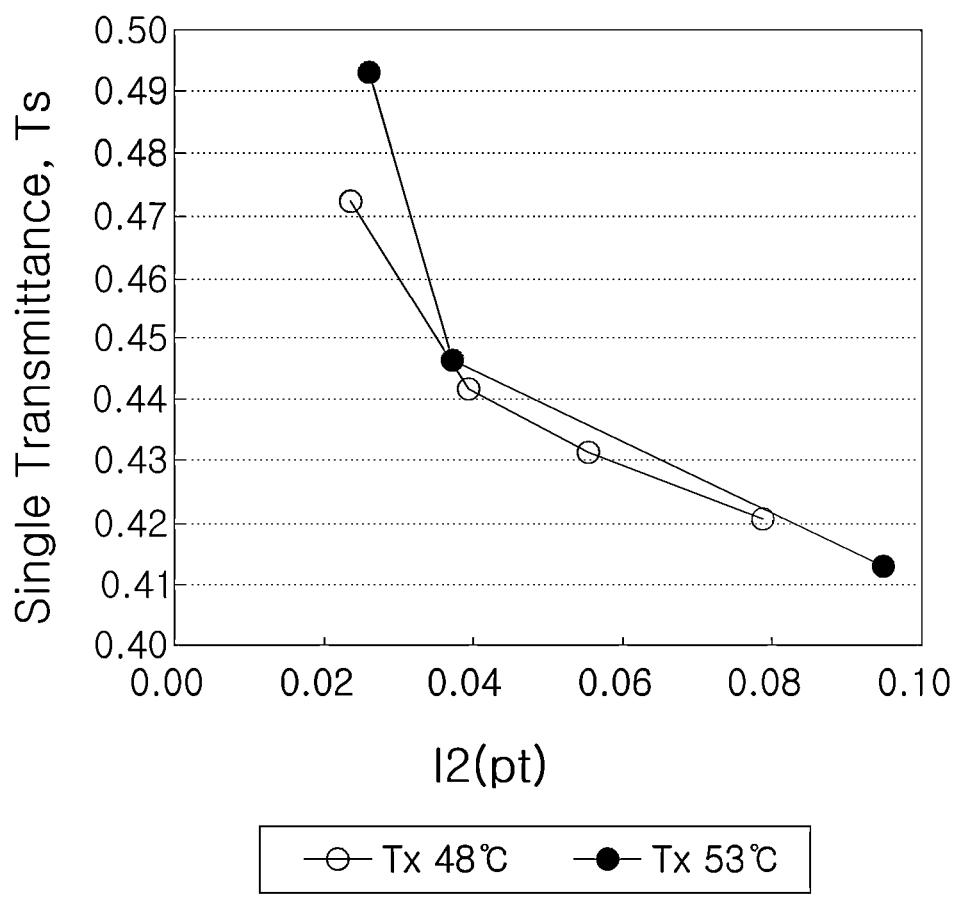
FIG. 1 is a graph illustrating a single transmittance according to iodine concentration in circular polarizers manufactured by the Manufacturing Example of the present invention.

After conducting studies into improving the visibility and color tone of a reflective liquid crystal display (LCD), it was seen that the visibility and color tone of the reflective LCD can be significantly improved when a circular polarizer in which an absorption axis of a polarizing film and an optical axis of a ¼ wavelength plate, disposed at specific angles with respect to a liquid crystal alignment direction of a liquid crystal cell, are used.

According to the reported results of the studies, when the absorption axis of the polarizing film and the optical axis of the ¼ wavelength plate are respectively disposed at angles of about 85° to about 95° and about 130° to about 135° with respect to the liquid crystal alignment direction of the liquid crystal cell, it was seen that a color of white light is shifted from a yellow region to a blue region, significantly improving visibility and color tone.

Exemplary embodiments of the present invention will now be described in detail with reference to the accompanying drawings. A circular polarizer of the present invention includes (i) a polarizer including a polarizing film and (ii) a ¼ wavelength plate. The polarizing film according to the present invention has an absorption axis disposed at an angle of about 85° to about 95°, more particularly, about 90° with respect to a liquid crystal alignment direction of a liquid crystal cell. The ¼ wavelength plate has an optical axis disposed at an angle of about 130° to about 140°, more particularly, about 135° with respect to the liquid crystal alignment direction of the light crystal cell. Here, the absorption axis of the polarizing film denotes an optical axis in which a poly vinyl alcohol (hereinafter, referred to as a PVA) film dyeing iodine is elongated in one axis direction to absorb light when the polarizing film is manufactured. The optical axis of the ¼ wavelength plate denotes an axis in which two orthogonal components of light transmitting the ¼ wavelength plate have the same intensity in the electrical fields thereof. For example, in the case of a phase difference film, the optical axis of the ¼ wavelength plate denotes an axis in an elongation direction when the phase difference film is elongated into one axis or two axes to cause a phase difference.

The polarizing film denotes an optical device which transmits only light polarized in a specific direction. In general, the polarizing film has a structure in which a PVA-based polymer chain is aligned in a certain direction. The polarizing film contains an iodine-based compound or a dichroism polarization material. A PVA-based film is dyed with an iodine or a dichroism dye, and is then elongated in a certain direction and cross-linked to manufacture such a polarizing film. Here, a degree of polymerization of the PVA is not limited. However, when considering free molecular movement and the smooth mixing of component materials, the degree of polymerization of the PVA may be about 1,000 to about 10,000, and more particularly, about 1,500 to about 5,000.

The polarizing film may have a transmittance of about 43% to about 47%. In CIE coordinates, a color "a" may be about −1 to about −0.6, and a color "b" may be about 0.3 to about 2.5.

Here, the color "a" and the color "b" denote values expressing colors in CIE coordinates. Furthermore, the color "a" is calculated using an Equation: a=500 [$(X/Xn)^{1/3}-(Y/Yn)^{1/3}$], where +a denotes a red color and −a denotes a green color. Also, the color "b" is calculated using an Equation: b=200 [$(Y/Yn)^{1/3}-(Z/Zn)^{1/3}$], where +b denotes a yellow color and −b denote a blue color (where Xn, Yn, and Zn correspond to X, Y, and Z coordinates for a reference white color).

The transmittance of the polarizing film may be controlled by adequately adjusting an iodine concentration in the dyeing process. A KI concentration may be adjusted in a complementary color process of the polarizer manufacturing process to produce iodine ion species absorbing light having a short wavelength. Also, the amount of iodine ion species may be adjusted to control a color of the polarizing film.

When the polarizing film having the above-described transmittance and colors "a" and "b" is used, white color balance may be superior, as compared to the prior art.

Since the polarizing film has a thin thickness, a protection film may be attached to one surface or both surfaces of the polarizing film to manufacture the polarizer. Here, a triacethyl cellulose (TAC) film may mainly be used as the protection film. Alternatively, the TAC film may be attached to the polarizing film using an adhesive. Also, a functional film such as a wide-viewing angle plate or a brightness enhanced film, except for a protection film, may be additionally attached to the polarizer to improve an additional function.

The ¼ wavelength plate converts linearly polarized light into circularly polarized light. As described above, the optical axis of the ¼ wavelength plate of the present invention may be disposed at an angle of about 135° with respect to the liquid crystal alignment direction of the liquid crystal cell.

The ¼ wavelength plate may include a cyclo olefin polymer (COP)-based film, a polycarbonate film, or a liquid crystal film, which are elongated into one axis. Particularly, among these, the ¼ wavelength plate may include a monoaxial oriented film.

In this case, the ¼ wavelength plate of the present invention may have an in-plane phase difference of about 120 nm to about 170 nm in a wavelength of about 550 nm. The in-plane phase difference is calculated using following Equation, where $n_x$, $n_y$, and $n_z$ denote refractive indexes in x-axis, y-axis, and z-axis directions (a thickness direction), respectively, and d denotes a thickness of the ¼ wavelength plate.

$$\text{In-plane phase difference } R_{in}=(n_x-n_y)\times d \qquad \text{Equation}$$

A reflective LCD according to the present invention will be described below.

The reflective LCD of the present invention includes an upper substrate, a lower substrate, a liquid crystal cell, a reflective plate, and a circular polarizer.

Here, the upper and lower substrates may include a substrate formed of a transparent material, for example, a glass or light-transmitting plastic substrate.

The upper and lower substrates face each other with a predetermined distance therebetween. Also, switching devices for driving a liquid crystal cell are disposed on facing surfaces of the upper and lower substrates.

The liquid crystal cell is disposed between the upper substrate and the lower substrate. Also, the liquid crystal cell is formed of liquid crystals having positive dielectric anisotropy. A driving mode may be changed according to an arrangement and driving state of the liquid crystals within the liquid crystal cell. The reflective LCD may be operated in various modes such as a twisted nematic (TN) mode, a super twisted nematic (STN) mode, a polymer dispersed liquid crystal (PDLC) mode, an electrically controlled birefringence (ECB) mode, and an in plane switching (IPS) mode. When comparing a viewing angle, the reflective LCD may be operated in the ECB or ISP mode, but is not limited thereto.

In the present invention, the LCD may have a liquid crystal cell gap of about 2.0 μm to 2.4 μm. When the LCD has a liquid crystal cell gap ranging from about 2.0 μm to 2.4 μm, the white color may be significantly improved.

The reflective plate reflects light incident from the outside of the LCD to the reflected light as a light source. Also, the reflective plate is disposed between the lower substrate and the liquid crystal cell or under the lower substrate. The reflective plate may be manufactured by the depositing of a conductive metal, e.g., aluminum or silver.

The above-described circular polarizer of the present invention is used as the reflective LCD. As described above, the circular polarizer of the present invention includes the polarizer including a polarizing film in which an absorption axis is disposed at an angle of about 85° to about 95°, more particularly, about 90° with respect to a liquid crystal alignment direction of a liquid crystal cell and a ¼ wavelength plate in which an optical axis is disposed at an angle of about 130° to about 140°, more particularly, about 135° with respect to the liquid crystal alignment direction of the light crystal cell. Here, the polarizing film may be formed of a PVA film and have a transmittance of about 43% to about 47%. In CIE coordinates, a color "a" may be about −1 to about −0.6, and a color "b" may be about 0.3 to about 2.5. Also, the ¼ wavelength plate may be a monoaxially oriented film having an in-plane phase difference of about 120 nm to about 170 nm in a wavelength of about 550 nm. Since the circular polarizer has the same function and configuration as the above-described circular polarizer, detailed description thereof will be omitted.

Hereinafter, the present invention will be described in detail with respect to specific embodiments.

MANUFACTURING EXAMPLE

A PVA film (manufactured by Kuraray Co. Ltd., and degree of polymerization: 2400) was immersed in a washing bath and a swelling bath and dyed in an aqueous solution containing $I_2$ and KI. Then, the PVA film was elongated five times in an aqueous solution containing boric acid and KI to manufacture polarizing elements. Here, an $I_2$ concentration and a dyeing bath temperature are shown in the following Table 1. Also, the KI solution was adjusted to have a concentration of about 2% to about 4% in a complementary color process to control a color of each of the polarizing elements.

Thereafter, a TAC film having a thickness of about 60 µm was disposed on both surfaces of the polarizing element and a PVA-based adhesive solution was injected between the polarizing element and the TAC film to laminate them together using a laminator. Then, the resultant structure was dried for about eight minutes at a temperature of about 80° C. to manufacture a polarizer. A ¼ wavelength phase difference film was disposed on a flat surface of the manufactured polarizer, and then an optical axis of the ¼ wavelength phase difference film was disposed at an angle of about 45° with respect to an absorption axis direction of the polarizer using an adhesive film. Then, the resultant structure was laminated to manufacture a circular polarizer having high transmittance.

Experimental Example 1

Transmittances and colors of the polarizers manufactured by the manufacturing example were measured using a spectrophotometer (manufactured by N&K Technology, Inc.). The measured results are shown in Table 1 below. Also, FIG. 1 is a graph illustrating single transmittances (Ts) of the polarizers according to an iodine concentration.

TABLE 1

| Elongation Temperature | Norm. I2 (pt) | I2 (pt) | a | b | Ts | Tc | Ac |
|---|---|---|---|---|---|---|---|
| 48 | 1.00 | 0.079 | −1.14 | 3.00 | 0.4203 | 0.00033 | 3.48 |
|  | 0.70 | 0.055 | −0.92 | 2.41 | 0.4316 | 0.00138 | 2.86 |
|  | 0.50 | 0.040 | −0.79 | 1.82 | 0.4418 | 0.00719 | 2.14 |
|  | 0.30 | 0.024 | −0.69 | 1.24 | 0.4719 | 0.04805 | 1.32 |
| 53 | 1.00 | 0.095 | −1.50 | 3.16 | 0.4132 | 0.00019 | 3.72 |
|  | 0.39 | 0.037 | −0.94 | 1.42 | 0.4464 | 0.00979 | 2.01 |
|  | 0.27 | 0.026 | −1.05 | 0.70 | 0.4929 | 0.08232 | 1.08 |

*Norm. $I_2$: Relative iodine concentration
$I_2$: Iodine concentration
Ts: Single transmittance
Tc: Orthogonal transmittance
Ac = −log(Tc), absorbance Referring to Table 1 and FIG. 1, it is seen that the transmittance of the polarizer may be adequately adjusted by adjusting the iodine concentration.

Experimental Example 2

Figure 2:
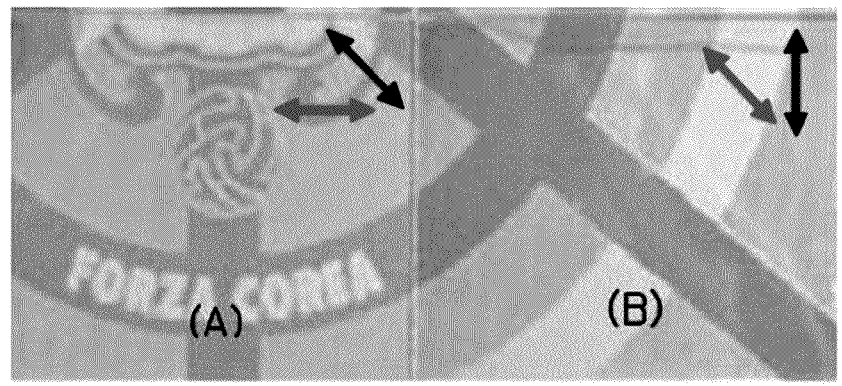
FIG. 2 is a photograph illustrating a change of a color tone according to an arrangement of circular polarizers.

Two circular polarizer samples each having a transmittance of about 47% and an in-plane phase difference value of about 130 nm in a ¼ phase difference plate were laminated on a surface of a reflective LCD in directions different from each other, and then, the color tones thereof were compared and measured by human eye visual inspection. FIG. 2 is a photograph illustrating the measured results. FIG. 2(A) illustrates measured results in a case in which the circular polarizer samples are laminated so that an absorption axis of the polarizer is inclined at an angle of about 90° and an optical axis of the ¼ wavelength plate is inclined at an angle of about 135° with respect to a liquid crystal alignment direction of a liquid crystal cell. FIG. 2(B) illustrates measured results in case where the circular polarizer samples are laminated so that the absorption axis of the polarizer is inclined at an angle of about 45° and the optical axis of the ¼ wavelength plate is inclined at an angle of about 90° with respect to the liquid crystal alignment direction of the liquid crystal cell.

When a power is supplied to the LCD, as shown in FIG. 2, in case where the absorption axis of the polarizer and the optical axis of the ¼ wavelength plate are inclined at angles within the above-described ranges with respect to the liquid crystal alignment direction, i.e., in case of the sample A, white and black color tones were maintained. On the other hand, in case where the optical axis of the ¼ wavelength plate is inclined at an angle outside of the above-described range, i.e., in the case of the sample B, the white and black color tones were distorted to have a bluish color tone. This may be interpreted as a color shift phenomenon occurring in a case in which the optical axis of the ¼ wavelength plate is not adequately aligned to change a polarized state of light.

Experimental Example 3

Figure 3:
FIG. 3 is a photograph illustrating visual perception characteristics according to transmittances and phase difference values of circular polarizers.

Circular polarizer samples having different transmittances and different in-plane phase difference values of a ¼ phase different plate were laminated on a surface of a reflective LCD, and then, visual perception characteristics thereof were compared and measured by human eye visual inspection. FIG. 3 is a photograph illustrating the measured results.

In FIG. 3, sample A, disposed at the far left side, represents a related-art circular polarizer in which a ¼ phase difference plate and a ¼ phase difference plate are laminated to a polarizing element having a transmittance of about 42%. Samples B1 to B3 shown at a middle portion represent circular polarizers in which the polarizer having the high transmittance according to the present invention is applied and ¼ phase difference plates each having an in-plane phase difference of about 130 nm are attached to polarizing elements having transmittances of about 45%, 46%, and 47% in order from the top. Samples C1 to C3 disposed at the most right side represent circular polarizers in which ¼ phase difference plates each having an in-plane phase difference of about 110 nm are attached to polarizing elements having transmittances of about 45%, 46%, and 47% in order from the top.

As shown in FIG. 3, in the case in which the circular polarizers B1 to B3, having the high transmittance, are used, it is seen that more neutral white color tone is realized when compared to a case in which an existing circular polarizer is used. However, even though each of the circular polarizers B1 to B3 has high transmittance, when the circular polarizers have a phase difference of about 110 nm (C1 to C3), it is seen that the color shift occurs in a reddish color direction to relatively reduce the impression of color.

When the circular polarizer of the present invention is applied to the reflective LCD, a contrast ratio may be improved to enhance visibility when compared a case in which the related-art circular polarizer is used. In addition, the yellow color tone may be reduced to realize superior white balance.

While the present invention has been shown and described in connection with the exemplary embodiments, it will be apparent to those skilled in the art that modifications and variations can be made without departing from the spirit and scope of the invention as defined by the appended claims.

[Description Of The Symbols]

FIG. 2(A) illustrates measured results in a case in which the circular polarizer samples are laminated so that an absorption axis of the polarizer is inclined at an angle of about 90° and an optical axis of the ¼ wavelength plate is inclined at an angle of about 135° with respect to a liquid crystal alignment direction of a liquid crystal cell. FIG. 2(B) illustrates measured results in case where the circular polarizer samples are laminated so that the absorption axis of the polarizer is inclined at an angle of about 45° and the optical axis of the ¼ wavelength plate is inclined at an angle of about 90° with respect to the liquid crystal alignment direction of the liquid crystal cell.

FIG. 3(A) represents a related-art circular polarizer in which a ¼ phase difference plate and a ¼ phase difference plate are laminated to a polarizing element having a transmittance of about 42%. FIGS. 3(B1) to 3(B3) represent circular polarizers in which the polarizer having the high transmittance according to the present invention is applied and ¼ phase difference plates each having an in-plane phase difference of about 130 nm are attached to polarizing elements having transmittances of about 45%, 46%, and 47% in order from the top. FIGS. 3(C1) to 3(C3) represent circular polarizers in which ¼ phase difference plates each having an in-plane phase difference of about 110 nm are attached to polarizing elements having transmittances of about 45%, 46%, and 47% in order from the top.

What is claimed is:

1. A circular polarizer for a reflective liquid crystal display, comprising:
    a polarizer comprising a polarizing film in which an absorption axis has an angle of about 85° to about 95° with respect to a liquid crystal alignment direction of a liquid crystal cell, where, in CIE coordinates, a color "a" is about −1 to about −0.6 and a color "b" is about 0.3 to about 2.5; and
    a ¼ wavelength plate in which an optical axis has an angle of about 130° to about 140° with respect to the liquid crystal alignment direction of the light crystal cell.

2. The circular polarizer of claim 1, wherein the polarizing film is formed of a poly vinyl alcohol film.

3. The circular polarizer of claim 1, wherein the polarizing film has a transmittance of about 43% to 47%.

4. The circular polarizer of claim 1, wherein the ¼ wavelength plate comprises a monoaxial oriented film.

5. The circular polarizer of claim 4, wherein the ¼ wavelength plate has an in-plane phase difference of about 120 nm to 170 nm in a wavelength of about 550 nm.

6. A reflective liquid crystal display comprising:
    an upper substrate;
    a lower substrate facing the upper substrate at a predetermined distance;
    a liquid crystal cell disposed between the upper substrate and the lower substrate;
    a reflective plate disposed between the lower substrate and the liquid crystal cell or under the lower substrate; and
    a circular polarizer disposed on the upper substrate,
    wherein the circular polarizer comprises: a polarizer comprising a polarizing film in which an absorption axis has an angle of about 85° to about 95° with respect to a liquid crystal alignment direction of a liquid crystal cell, where, in CIE coordinates, a color "a" is about −1 to about −0.6 and a color "b" is about 0.3 to about 2.5; and
    a ¼ wavelength plate in which an optical axis has an angle of about 130° to about 140° with respect to the liquid crystal alignment direction of the light crystal cell.

7. The reflective liquid crystal display of claim 6, wherein the polarizing film is formed of a poly vinyl alcohol film.

8. The reflective liquid crystal display of claim 6, wherein the polarizing film has a transmittance of about 43% to 47%.

9. The reflective liquid crystal display of claim 6, wherein the ¼ wavelength plate comprises a monoaxial oriented film.

10. The reflective liquid crystal display of claim 9, wherein the ¼ wavelength plate has an in-plane phase difference of about 120 nm to 170 nm in a wavelength of about 550 nm.

11. The reflective liquid crystal display of claim 6, wherein the reflective liquid crystal display is operated in an in plane switching (IPS) mode or an electrically controlled birefringence (ECB) mode.

* * * * *